United States Patent [19]

Roberts et al.

[11] Patent Number: 4,820,328
[45] Date of Patent: * Apr. 11, 1989

[54] VITRIFICATION OF ASBESTOS WASTE

[75] Inventors: David Roberts, Washington, D.C.; Johnson H. Stuart, Sheffield, England

[73] Assignee: King Taudevin & Gregson (Holdings) Limited (British Company), Sheffield, England

[*] Notice: The portion of the term of this patent subsequent to Jul. 7, 2004 has been disclaimed.

[21] Appl. No.: 69,179

[22] Filed: Jul. 2, 1987

Related U.S. Application Data

[63] Continuation-in-part of Ser. No. 899,630, Aug. 25, 1986, Pat. No. 4,678,493, which is a continuation of Ser. No. 672,475, Nov. 16, 1984, abandoned.

[30] Foreign Application Priority Data

Nov. 21, 1983 [GB] United Kingdom ................. 8331031

[51] Int. Cl.⁴ .......................... C03B 5/02; C03C 3/087
[52] U.S. Cl. .......................................... 65/134; 65/27; 65/346; 501/27; 501/32; 501/155
[58] Field of Search ................. 501/27, 30, 32, 155; 65/27, 134, 346, 347, 339, 342

[56] References Cited

U.S. PATENT DOCUMENTS

| | | | |
|---|---|---|---|
| 1,069,255 | 8/1913 | Herault | 65/134 |
| 1,394,973 | 10/1921 | Crossley | 65/18.1 X |
| 3,907,956 | 9/1975 | Meunier | 65/134 X |
| 4,468,473 | 8/1984 | Drolet et al. | 501/155 |
| 4,476,235 | 10/1984 | Bultel et al. | 501/155 X |

OTHER PUBLICATIONS

*Stones and Cords in Glass* Clark et al pp. 63–64 Society of Glass Technology (date unknown, vol. 190 unknown).

Primary Examiner—Robert L. Lindsay
Attorney, Agent, or Firm—Shoemaker and Mattare, Ltd.

[57] ABSTRACT

Wate asbestos is converted into a glass by maintaining within an electrical glass melting furnace a body of molten glass at a temperature above the decomposition temperature of asbestos; supplying asbestos to the furnace by a conveyor discharging above the body of molten glass so that the asbestos falls onto the molten glass and becomes decomposed and melted into glass; and withdrawing molten glass from the furnace at a temperature of at least 1000° C. The asbestos is advantageously mixed with cullet and a melt accelerator and fed into the furnace by means of a screw mixer/conveyor. The furnace is advantageously operated at a pressure less than atmospheric pressure.

15 Claims, 3 Drawing Sheets

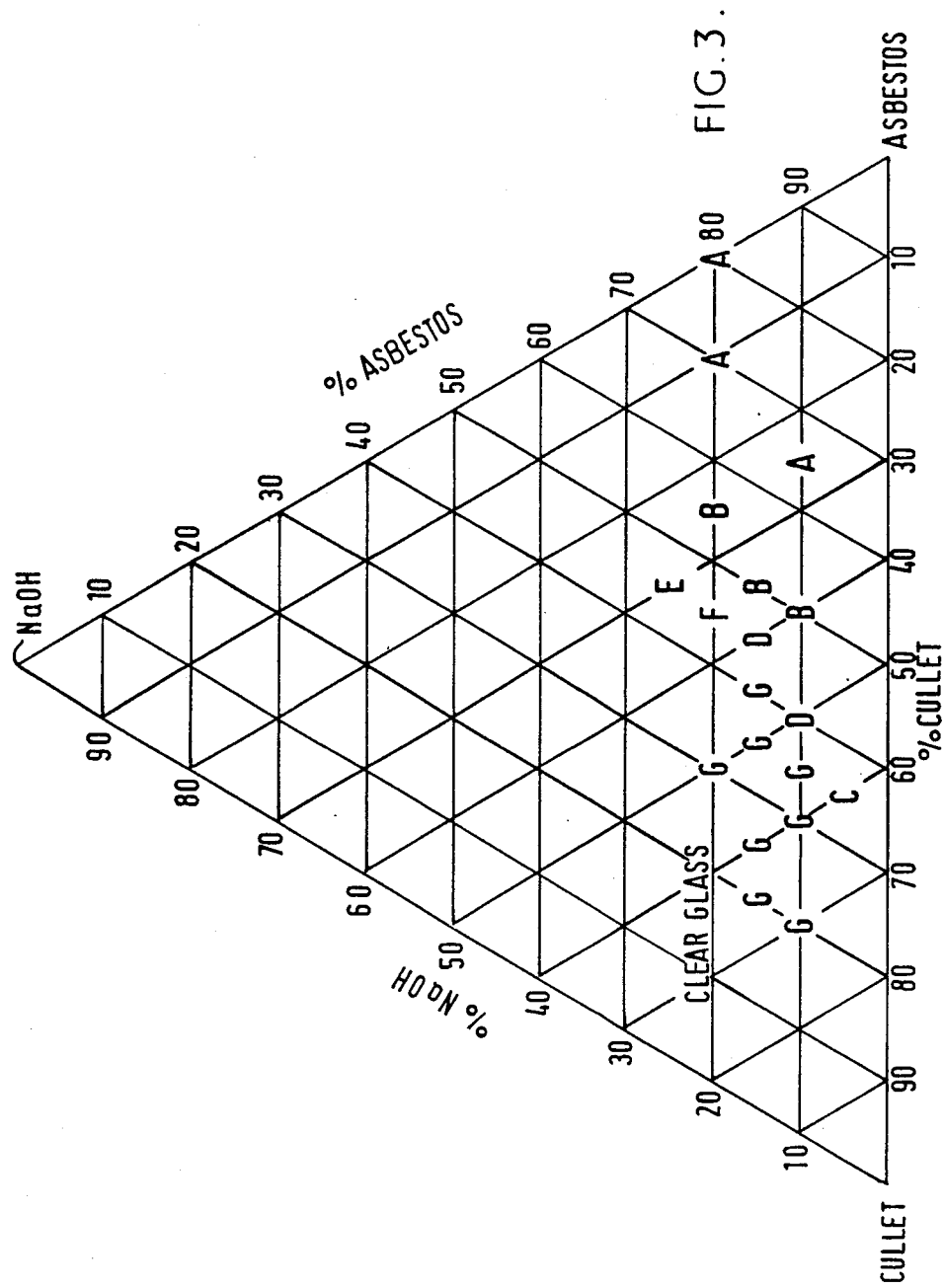

VITRIFICATION OF ASBESTOS WASTE

FIELD OF THE INVENTION

The present invention which is a continuation-in-part of our application No. 899,630 now U.S. Pat. No. 4,678,493, granted July 7, 1987 which is a continuation of application Ser. No. 672,475, filed Nov. 16, 1984, now abandoned.

BACKGROUND TO THE INVENTION

Asbestos is a range of complex silicates. The main forms of asbestos are:

Chrysotile—white asbestos $3MgO.2SiO_2 2H_2O$
Amosite—brown asbestos $FeMgSiO_3$
Crocidolite—blue asbestos $NaFe(SiO_3)_2 FeSiO_3 H_2O$
Anthophyllite—$(MgFe)_7 Si_8 O_{22}(OH)_2$ These materials break down when subjected to temperatures in the range 400° C. to 900° C. The water is lost from the molecule and the fibrous structure is destroyed leaving simpler compounds such as pyroxenes and silicates. As a result of this breakdown the fibrous nature and therefore the toxicity of the material is destroyed. It would therefore have seemed logical, when attempting to design a process to make asbestos-containing waste permanently non-toxic to consider a heat treatment process.

However, before attempting to design such a process it is necessary to establish the requirements which should be fulfilled to provide a minimum specification for an acceptable process. These requirements are as follows:

(1) The process must render asbestos permanently non-toxic;
(2) The process must be intrinsically safe in operation;
(3) The process must be capable of handling all forms of asbestos and all the materials likely to be associated with asbestos and therefore potentially present in the waste material to be processed;
(4) The process must be simple to operate.

Having established these criteria, the use of thermal decomposition was rejected because it was found that it is impossible in practice to design a safe process. Any malfunction of the time/temperature profile of the system, any change in the composition of the material being fed, variation in water content and, more seriously, incorrect operation by the person controlling the system would create a situation where unconverted asbestos would remain the product leaving the process. In these circumstances instead of making the waste safe the material would in fact have been made more dangerous. There is no method of 100% testing a material for the presence of asbestos and the so-called safe product could still contain potentially dangerous quantities of unconverted asbestos.

Consideration might therefore be given to other properties of asbestos to see if a different approach could solve the problem. All forms of asbestos are silicates. The majority of glass compositions are silicates. It should in principle be possible to convert asbestos into glass. However, there were a number of objections to this approach. Asbestos is a high temperature insulator and its fibrous structure makes heat penetration into the bulk of the material difficult.

Also asbestos is known to produce solid inclusions in glass if it accidentally enters a furnace. Such inclusions arise when the asbestos decomposes into products such as pyroxenes having higher melting points than asbestos itself and higher than conventional glass-making temperatures.

Nevertheless, an electrically powered furnace with a submerged throat off-take was thought to form the basis for a safe process.

The use of inter alia asbestos in glass manufacture was proposed by Crossley in U.S. Pat. No. Re. 15,727 of U.S. Pat. No. 1,394,973. He proposed to heat vitreous material and mica or asbestos to a temperature above the melting point of the glass but below the decomposition temperature of the asbestos so that the physical and chemical characteristics of the mica or asbestos were preserved, and temperatures of 650°–900° C. were employed. But insofar as the asbestos was not destroyed and did not become part of the glass matrix, it retained its toxic properties, and glass derived from asbestos according to Crossley's process would not now be regarded as safe to discharge on a waste tip. The vitrification of asbestos was also taught by Santt in French patent specification No. 2398704 but he considered incorrectly that asbestos is destroyed at temperatures above 600° C. and relied on the presence of iron to form a glass or frit. Although some of the mixtures tested by Santt were melted sufficiently to be pourable, it is not clear that complete melting to produce a homogeneous molten glass had taken place. Nor was it clear, before an actual experiment had been carried out, that asbestos could be melted on a practical as opposed to a laboratory scale.

SUMMARY OF THE INVENTION

This invention is based on the discovery that asbestos can be converted into a non-toxic glass in an enclosed electrical glass melting furnace with only minimal risk of asbestos being released to the atmosphere by feeding the asbestos in admixture with cullet or glass-making material from above into a body of glass in the furnace, the mixture of asbestos with cullet or glass-making materials falling onto the body of already molten glass and melting into glass.

The present invention provides a process for converting waste asbestos into a glass which comprises providing within an electrical glass melting furnace a body of molten glass at a temperature above the decomposition temperature of asbestos;

supplying asbestos to the furnace by conveyor means discharging above the body of molten glass so that the asbestos falls onto the molten glass and becomes decomposed and is melted to glass, the asbestos being supplied in an amount such that a substantial proportion of the molten glass in said body is derived therefrom; and withdrawing molten glass from the furnace at a temperature of at least 1000° C.

The process described above can be operated batchwise but has the advantage that it can also be operated continuously. Furthermore the bulk of the glass product is far less than that of the waste asbestos, so that disposal is a greatly reduced problem.

The asbestos that can be processed according to the invention includes the principal forms chrysotile, amosite, crocidolite and anthophyllite as well as asbestos containing materials such as asbestos-cement materials used e.g. as roofing and constructional materials.

Under normal circumstances, if a large quantity of asbestos were added to a glass melting furnace only a small proportion would dissolve in the glass. The result would be a glassy matrix containing unconverted and partly converted asbestos residues. When the glass was subsequently cooled and broken up, asbestos surfaces would be exposed, with the attendant risks of asbestos dust.

DESCRIPTION OF PREFERRED FEATURES

We have found in laboratory scale melting tests that by combining chrysotile (a difficultly fusible form of asbestos) with cullet (waste glass) and as little as 10% by weight NaOH as melt accelerator, in solution in water, the chrysotile will dissolve completely producing a well defined and homogeneous glass. Trials have shown that melting to a glass can be accomplished in less than 1 hour at 1250° C. In pilot plant melting trials using a furnace having a 0.5 tons/day capacity it was found that lesser amounts of sodium hyroxide, e.g. 0–5% by weight and preferably 0–2% by weight would adequately accelerate melting and reduce melt temperature and power consumption.

The melt accelerator may in general be an alkali metal compound, an alkaline earth metal compound, a boron compound, a fluoride or chloride or a slag such as blast furnace slag. It is believed that potassium hydroxide is an effective melt accelerator, as may be a suspension of an alkaline earth metal hydroxide such as calcium hydroxide. Carbonates may be employed but are not preferred because they increase the volume of gas evolved and hence need more elaborate air filtration systems. And for the same reason melting in an electric furnace is used instead of other kinds of glass melting furnaces such as top fired gas furnaces.

The use of cullet in admixture with the asbestos, particularly chrysotile asbestos, is preferred because it effectively dissolves and decomposes the asbestos and is low melting. But the asbestos can be mixed with glass-making materials such as soda ash, sand and limestone subject to somewhat higher furnace operating temperatures. Up to 80% by weight of the material fed may be asbestos, the balance being cullet and melt accelerator.

If desired a source of fluoride ions such as sodium, potassium or calcium fluorides may be incorporated into the mixture to provide a more aggressive dissolving medium for the asbestos and to reduce melt viscosity, thereby giving better mass transfer properties.

It has been found that readily fusible iron-containing forms of asbestos, and in particular blue asbestos which contains iron, can be melted to glass without addition of melt accelerator and even without addition of cullet.

For convenience in handling and the least impact on the environment, the asbestos should be maintained in a sealed environment once it has been brought to the furnace. Thus the asbestos and cullet or glass-making material are preferably conveyed to the furnace by sealed mixing and conveying means. Thus asbestos from an asbestos hopper together with material from a cullet or glass-making material hopper are fed directly into a screw conveyor together with any melt accelerator, the screw conveyor in turn leading direct into the furnace.

The furnace and feed system are preferably operated at reduced pressure to minimise emission of asbestos to the environment. In this respect the invention differs from normal glass-making practice where the furnace is operated at a slight positive pressure to minimise inflow of cold air.

It has further been appreciated that a plant for carrying out the asbestos vitrifying process aforesaid might be provided in portable form. In this way the plant can be transported to a site such as a factory or power station where there was asbestos to be disposed of and the treatment can be carried out without the asbestos being transported from the site which is an operation that inevitably involves risk to the general public. Suitable transportable furnaces might have a capacity up to 10 tons per day.

If the furnace is electrically fired, it is believed that many sites will have sufficient three phase electrical power to run the furnace.

BRIEF DESCRIPTION OF THE DRAWINGS

In the accompanying drawings:

FIG. 3 is a graphic representation of the results of a laboratory batch melting trial.

DETAILED DESCRIPTION OF PREFERRED EMBODIMENT

Figure 1:
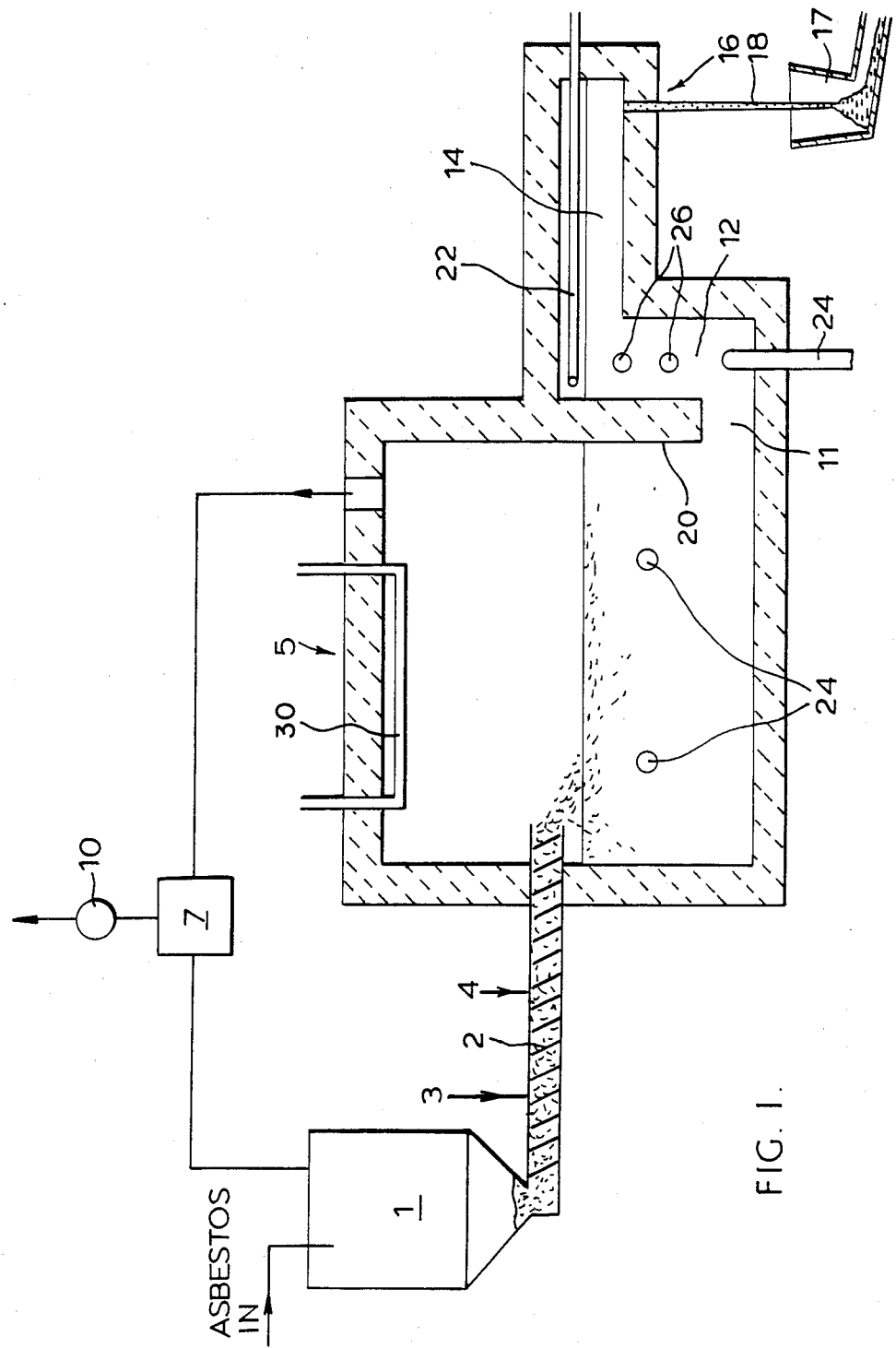
FIG. 1 is a schematic flow chart for the process of the invention.
Figure 2:
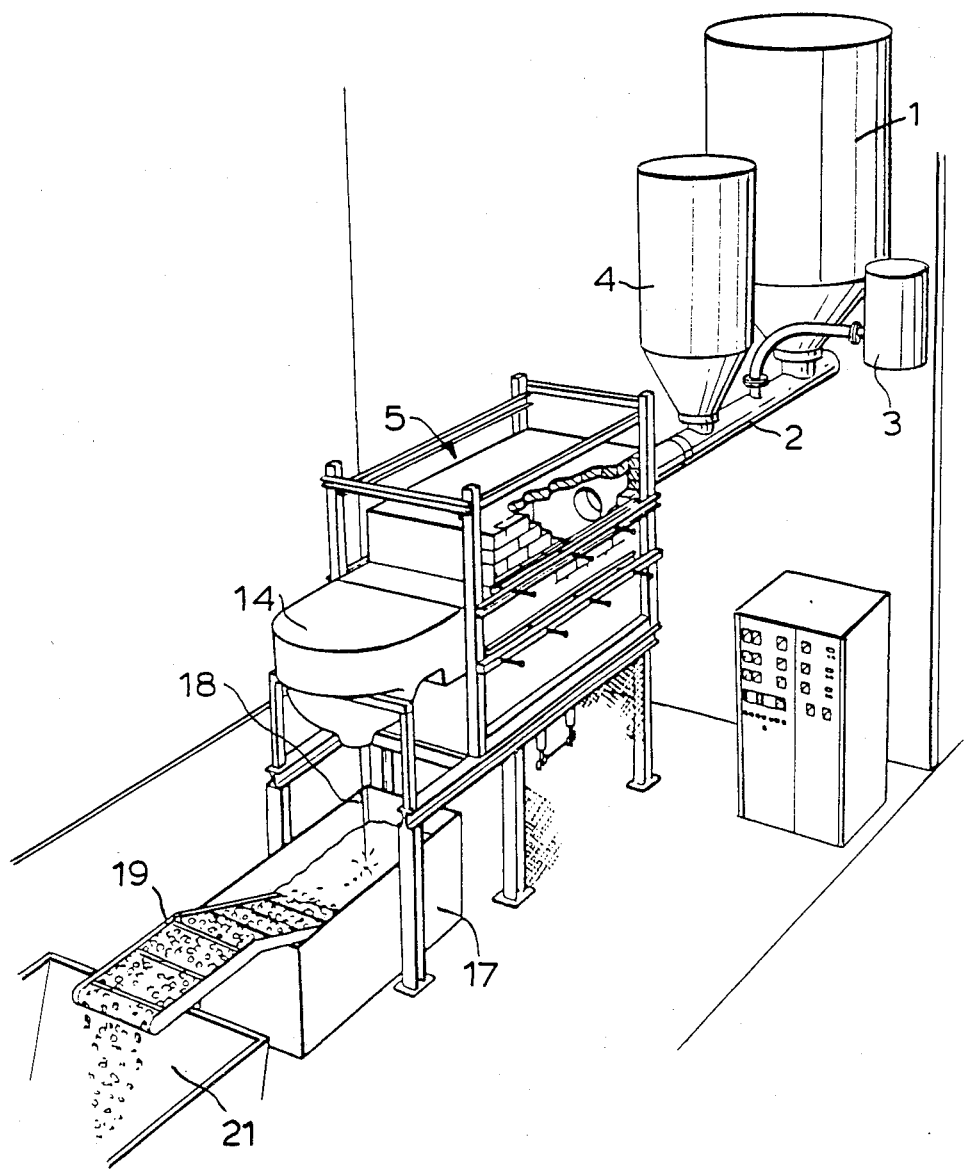
FIG. 2 is a sketch of a practical furnace installation according to the invention.

Once the asbestos has been received it is first pulverised if necessary to a size small enough to permit rapid melting and then kept in a totally enclosed storage hopper 1 maintained under reduced pressure to prevent any asbestos particles escaping to the atmosphere. The waste asbestos from hopper 1 is discharged along a screw conveyor/mixer 2 and aqueous sodium hydroxide is introduced at 3 and is intimately mixed with the asbestos. Complete coating of the asbestos with sodium hydroxide gives two advantages. Firstly, in wetting the asbestos it eliminates the possibility of dust being released after that point and secondly is an important aid in the rapid incorporation of the asbestos into the glass. Cullet (waste glass) is added at 4 and is mixed with the asbestos/sodium hydroxide mixture. The resultant material is introduced to an electric furnace 5 having a closed melting chamber in which a body of molten glass is maintained at above the decomposition temperature of asbestos (900° C.) and preferably at 1350°–1380° C. corresponding to a temperature of about 1250° C. at the top of the molten glass. Any entrained air, and the water released from the sodium hydroxide solution is vented from the furnace. If necessary, water may be condensed by a condenser (not shown), filtered in a filter (not shown), and discarded. But if the gases leaving the furnace 5 have a sufficiently high dew point water will not condense and the condenser may be omitted. The small amount of air is discharged via an efficient filter 7 to atmosphere via a fan 10 that maintains a reduced pressure. It is an advantage of using sodium hydroxide as opposed to sodium carbonate that the volume of gas evolved during melting is small so that the filtration system can be relatively inexpensive. In normal glass making a large quantity of gas is evolved, in addition large quantities of combustion products are released when fossil fuel firing is used. The glass which is produced 16 can either be quenched and disposed of as a safe non-toxic waste, or it could form a process feed stock for forming into a variety of glass products such as fibre insulation, ballotini, blocks, bottles, vitreous enamels and ceramic tiles.

According to a further preferred feature of the invention a submerged throat is used at the discharge end of the furnace 5. In FIG. 1, the furnace 5 is shown as having a vertical wall 20 depending from its roof into the body of molten glass to define the throat region 11, and such a wall is required when the glass is to be melted in a reduced pressure sealed environment in the furnace as is preferred. It has a further practical benefit resulting from the flow properties of the glass. In operation of the process two properties of the glass are harmonised:

(1) the viscosity temperature relationship of glass, ie. the viscosity increase with falling temperatures;

(2) the fact that glass held within a certain temperature range will devitrify, ie. crystallize, resulting in a further increase in viscosity.

The viscosity/temperature relationship for the asbestos-derived glass has been examined over the range of compositions which are likely to be encountered for the three commercial types of asbestos, and one practical example from the development trials. The compositions examined are listed in Table 1, together with the compositions of the base glass.

TABLE 1

COMPOSITIONS

|  | $SiO_2$ | CaO | MgO | $R_2O$ | $Al_2O_3$ | $Fe_2O_3$ | Others |
|---|---|---|---|---|---|---|---|
| Glass Base | 74.5 | 11.3 | 0.2 | 12.3 | 1.3 | 0.1 | 0.3 |
| 20% Crocidolite | 69.2 | 9.1 | 0.2 | 11.5 | 1.1 | 8.6 | 0.3 |
| 80% Crocidolite | 53.6 | 2.3 | 0.04 | 9.4 | 0.3 | 34.3 | 0.06 |
| 20% Amosite | 66.3 | 9.1 | 4.6 | 9.8 | 1.0 | 8.9 | 0.3 |
| 80% Amosite | 41.5 | 2.3 | 17.8 | 2.5 | 0.3 | 35.5 | 0.1 |
| 20% Chrysotile | 69.7 | 9.0 | 10.3 | 9.9 | 1.0 | 0.1 | 0.2 |
| 80% Chrysotile | 54.2 | 2.2 | 40.7 | 2.5 | 0.3 | 0.01 | 0.09 |
| 20% Equal Mix | 49.6 | 2.3 | 19.5 | 4.9 | 0.3 | 23.3 | 0.1 |
| 80% Equal Mix | 68.3 | 9.0 | 5.0 | 10.5 | 1.0 | 5.9 | 0.3 |
| Practical Glass | 51.7 | 16.21 | 14.4 | 8.3 | 6.3 | 2.6 | 0.5 |

($R_2O$ means $Na_2O$ plus $K_2O$)

The viscosity of glass is known to be particularly affected by the levels of calcium, magnesium and iron, which are classed as "network modifiers" in glass technology. Their effect is to steepen the temperature viscosity curve, making the glass more fluid at high temperatures and more viscous at lower temperatures. In the range of compositions listed in Table 1 the viscosity at 950° C. increases by up to 190,000 poise compared to base glass with an average of 54,500 poise. At 1400° C. the average viscosity decreases to 38% of the base glass with the lowest viscosity being only 1% of the base glass viscosity.

It might be thought that glass could be forced to flow through the throat 11 and riser 12 of the furnace even at very high viscosities, providing sufficient pressure was applied upstream of the throat 11. In the present system, the pressure can only be applied by the differential head of glass on each side of the throat 11. It has been calculated that for a temperature of 1300° C. this head differential is 6.7 cm, which agrees to that found in normal glass-making systems. At 1100° C. for the "practical" glass made from asbestos in a development trial the head required was 2.05 m, whereas the available head in the furnace was limited to 20 cm.

These calculations were based on the assumption that the glass flowed at its designed rate, whereas the limitation of head means that the glass flows more slowly, reducing the flow of sensible heat into the throat 11, riser 12 and forehearth 14. Consequently, the temperature at the throat 11 would fall still further. The result of these cyclic events would cause flow to cease.

In a typical furnace according to the invention, the furnace throat 11 is designed so that the heat loss exceeds the sensible heat flow when the viscosity of the glass has risen to 3900 poise and the flow rate has consequentially fallen to less than 10% of the design flow. Flow rates for the furnace with 20 cm head of glass in a 5 ton/day furnace working at capacity using the glass made from cullet, asbestos and incidental materials is as follows:

TABLE 2

| Viscosity Poises | Flow Kg/min | Temp. °C. | Net Heat Flow Kcal/min |
|---|---|---|---|
| 128 | 3.5 (1) | 1300 | 1288 |
| 500 | 0.9 (2) | 1200 | 212 |
| 3,900 | 0.35 (2) | 1100 | Nil |
| 12,300 | 0.011 (2) | 1050 | −87 |
| 46,800 | 0.03 (2) | 1000 | −114 |

Beyond a viscosity of about 4000 poise there is no thermal equilibrium at or downstream of the throat 11 until the glass has cooled to the temperature outside the furnace. This is because the resultant cooling increases the viscosity which then further reduces the flow, increasing the heat deficit between the sensible heat in the glass and the conduction of heat through the throat and riser structure 11, 12, 14. The flow, therefore, rapidly reduces to zero. In the case of this invention, the temperature at which the viscosity rises to 4000 poise is greater than 1000° C. This temperaure is higher than that required to cause thermal decomposition of asbestos (900° C.), thus it creates an intrinsic device which will prevent any asbestos surviving and appearing in the product, no matter what malfunction of the system.

At the same time as these low temperatures are causing the flow to slow down by increasing the viscosity, a further factor is at work restricting the size of the throat and riser. Devitrification will be taking place. The devitrification temperature varies with the composition of the glass. It is known that increasing the amount of calcium in particular will cause the temperature at which the glass begins to devitrify to increase. Practical measurements are available only on the "practical" glass and show that devitrification begins at 1260° C. In proper operation of the present process, high devitrification temperatures are not difficult to handle as the flow rates are sufficiently high for crystal growth to be too low to cause trouble. However, as the temperature falls, the rate of crystal growth rises and the flow rate decreases, these two combine to enable significant amounts of crystalization to occur. These cyrstals will grow preferentially on the refractory walls, which are not only cooler, but also provide nucleation sites for the crystals. The result is that the throat and riser passages 11, 12 become coated with devitrified glass, restricting the size of the passages. This in turn slows the glass still further and the cycle will result in the passages becoming blocked.

Thus, it can be seen that the process claimed herein provides an "automatic valve" operated by the physical characteristics of the asbestos/glass system and the furnace which prevents asbestos which has not been exposed to temperatures higher than the decomposition temperature from leaving the furnace. This is important to user confidence in the applicants' process, which must not only be capable of being used to destroy asbestos, but also must not be capable of being abused to pass only partly decomposed asbestos that would otherwise be released into the environment.

Glass from the furnace 5 flows to an electrically top-heated take-off 14 from which a product stream 18 of homogeneous molten glass is bottom-discharged into a water quench tank 17 from which the resulting cullet is conveyed by belt conveyor 19 to a disposal skip 21. Water quenching has the advantage that the widest possible range of product streams are maintained as homogeneous glasses. The product stream 18 could be alternatively quenched by means of a water jet and propelled to a conveyor or other suitable disposal device.

The use of caustic soda and electric melting mean that with the exception of a very small amount of entrained air, the only gas released is steam which normally does not condense to water. If however water condenses, it can be easily and safely filtered. The process therefore results in products that are easy to dispose of from an environmental standpoint.

The invention will now be further described with reference to the following examples in which Example I describes laboratory batch melting trials (which provide background information useful for an understanding of the invention, but do not form a part thereof) and Example II is an example of the invention.

EXAMPLE I

Asbestos string which was assumed to be pure white asbestos was cut into 10–20 mm lengths which were separated into individual strands about 1–2 mm in diameter. White flint glass cullet was crushed to a particle size less than 5 mm. Laboratory grade sodium hydroxide was made up into aqueous solutions one containing 40 g/100 ml and the other containing 20 g/100 ml. Batches to be melted were made up as follows. Asbestos was weighed into a platinum alloy crucible and the appropriate amounts of the or each sodium hydroxide solution were pipetted onto the asbestos as evenly as possible. Where the solution wetted only a small amount of the asbestos, the asbestos was mixed around, after which the mixture of asbestos and sodium hydroxide was pressed down in the crucible and the cullet weighed onto it to form an even layer. The cullet was the uppermost layer because it had a higher bulk density than the asbestos/sodium hydroxide mixture which was packed firmly because these conditions were found to be the most favourable to small-scale melting. Each batch was of total weight 20 g and was heated at 1250° C. for 60 minutes. The compositions of the 20 batches used are shown in Table 3, the results obtained are shown in Table 4 and illustrated graphically in FIG. 3.

TABLE 3

| | BATCH COMPOSITIONS | | | | | | |
|---|---|---|---|---|---|---|---|
| | Batch-percent composition | | | Batch used | | | |
| Batch No. | Asbestos | Caustic Soda | Cullet | Asbestos (g) | Cullet (g) | Caustic Soda Soln. (ml) | |
| | | | | | | 40 g/100 ml | 20 g/100 ml |
| 1 | 80 | 20 | — | 16 | — | 10 | — |
| 2 | 70 | 20 | 10 | 14 | 2 | 10 | — |
| 3 | 65 | 10 | 25 | 13 | 5 | 5 | — |
| 4 | 55 | 20 | 25 | 11 | 5 | 10 | — |
| 5 | 50 | 20 | 30 | 10 | 6 | 10 | — |
| 6 | 50 | 15 | 35 | 10 | 7 | 5 | 5 |
| 7 | 50 | 10 | 40 | 10 | 8 | 5 | — |
| 8 | 45 | 25 | 30 | 9 | 6 | 10 | 5 |
| 9 | 45 | 20 | 35 | 9 | 7 | 10 | — |
| 10 | 45 | 15 | 40 | 9 | 8 | 5 | 5 |
| 11 | 40 | 20 | 40 | 8 | 8 | 10 | — |
| 12 | 40 | 15 | 35 | 8 | 7 | 5 | 5 |
| 13 | 40 | 10 | 50 | 8 | 10 | 5 | — |
| 14 | 35 | 15 | 50 | 7 | 10 | 5 | 5 |
| 15 | 35 | 10 | 55 | 7 | 11 | 5 | — |
| 16 | 35 | 5 | 60 | 7 | 12 | — | 5 |
| 17 | 30 | 20 | 50 | 6 | 10 | 10 | — |
| 18 | 30 | 10 | 60 | 6 | 12 | 5 | — |
| 19 | 25 | 15 | 60 | 5 | 12 | 5 | 5 |
| 20 | 20 | 15 | 65 | 4 | 11 | 5 | 5 |
| 21 | 20 | 10 | 70 | 4 | 14 | 5 | — |

TABLE 4

| | RESULTS OF ALL TRIALS | |
|---|---|---|
| Batch No. | Result | Reference in FIG. 1 |
| 1,2,3 | Completely unsatisfactory. Partial fusion to an inhomogeneous, buff-coloured mass containing incompletely dissolved asbestos. | A |
| 4,5,6,7 | Fairly large areas of 'crust' on glass surface. Undissolved material in body of glass. Also significant amount of glass formation. Might possibly form a glass with more time and perhaps stirring. | B |
| 16 | Considerable amount of undissolved material, apparently due to high glass viscosity. | C |
| 10,13 | Very small amount of surface 'scum' but fairly large amounts of incompletely dissolved material in glass bulk. Looks as though it would probably melt completely with more time and/or stirring. | D |
| 8 | Completely fused but appears to have devitrified. | E |
| 9 | Very close to clear glass formation but fairly large amount of 'cloudy' material in glass body. Would | F |

TABLE 4-continued

RESULTS OF ALL TRIALS

| Batch No. | Result | Reference in FIG. 1 |
|---|---|---|
| | almost certainly form a clear glass with more time or stirring | |
| 11,12,14, 15,17,18, 19,20,21 | Clear glass. | G |

It was found that provided an appropriate ratio between asbestos, caustic soda and cullet was selected a clear glass can be obtained in laboratory melting trials and it was postulated that large scale melting of batches of material of similar composition would be likely to be a practical proposition because the melting process becomes more reliable and controllable as batch size increases.

EXAMPLE II

Melting trials were carried out using a small electric furnace which was a refractory structure braced with steel and arranged generally as indicated in FIG. 1. The melt area of the tank was about 0.16 m² and the glass depth was about 450 mm. From FIG. 1 it can be seen that the furnace was similar to a 'U' tube arrangement where the liquid level in the furnace chamber 5 balanced the level in the forehearth. In operation batch for melting was fed onto the surface of the melt via a water-cooled screw conveyor/mixer 2 and glass left the forehearth 14 via an outlet orifice 16 as a product stream 18. Heating was provided by radiant elements 30, 22 in the furnace 5 and forehearth 14 superstructures and by electrodes immersed in the glass (one pair 24 in the tank 5 and another pair 26 in the riser 11). The furnace melting area was maintained under negative pressure by means of the air extractor 10 and filter 7 to remove any asbestos fibres that may have been present. By using a batch charger which could be sealed into the furnace at one end and into the asbestos handling area at the other the furnace could be operated in a clean environment. In consequence the furnace operator and maintenance staff did not require specialist protective clothing and breathing masks.

The empty furnace was warmed up from room temperature to 1080° C. approximately using the crown and forehearth radiant elements 30, 22 at a rate of about 10°-15° C./hour. At the end of the warm up procedure the following parameters were recorded:

| Furnace Crown Thermocouple Temperature | 1125° C. |
|---|---|
| Forehearth Crown Thermocouple Temperature | 1050° C. |
| Furnace Midwall Thermocouple Temperature | 1075° C. |
| Furnace Elements Output | 12.7 kW |
| Forehearth Element Output | 3.7 kW |

Glass container cullet was then loaded into the furnace 3 kg at a time and sufficient time was left between loadings for the thermocouple temperatures to recover close to their original values. When the glass level in the tank 5 had reached 75 mm approximately the furnace immersed electrodes 24 were advanced 50 mm into the glass and the power applied. This procedure was repeated until the electrodes 24 had been advanced up to 250 mm approximately after which cullet was added until the furnace was filled up to its operating level. The following parameters were noted at this point of the operation.

| | Temperature | Power |
|---|---|---|
| Furnace Crown | 1240° C. | 15.7 kW |
| Furnace | 1380° C. | 15.7 kW |
| Forehearth | 1245° C. | 4.8 kW |

The flow of glass from the furnace was initiated by heating the bottom of the discharge orifice 16 with a gas burner. Once the glass was flowing continuously the burner was no longer required. When the flow was to be shut off this was achieved by either stopping batch charging and waiting until the level of glass dropped and the flow ceased or by sealing the outlet orifice 16 with a plunger. During periods of no flow the plunger was always used to seal the orifice 16 or a gas flame was applied to prevent excessive cooling of the area around the orifice 16 and freezing of any glass remaining.

Once the glass flow had commenced a series of mixtures containing asbestos was prepared for melting trials. A given mix was loaded into the furnace at an initial rate of about 1 kg every 10 minutes. The feed rate was varied depending on the conditions in the furnace until an optimum steady feed rate was established for a particular mix. If necessary the furnace temperatures were adjusted to increase or decrease the melt rate. If the feed rate was too high this became evident when the crown temperature dropped too low or by a visible effect of the furnace filling up to the crown with unmelted material floating on the glass melt. The furnace 5 could be operated with the crown elements 30 switched off (ie. cold top operation) but the melt rate was increased by operating with them on (hot top operation). In addition it was found that the top heat reduced the tendency of foam to form on the surface of the melt. The rate of flow of glass from the forehearth 14 was increased when required by increasing the rate of batch charging and also by increasing the temperature of the forehearth 14. Care was taken to ensure that the level of glass in the forehearth 14 did not increase above a certain depth as for example in the case where the forehearth orifice 16 blocked up and the batch charger continued to feed material into the furnace. If the depth of glass in the forehearth becomes too deep the forehearth radiant elements 22 will not be capable of heating through the dark coloured glass to the bottom of the forehearth 14 and the glass in it could freeze solid.

A product stream 18 of glass leaving the furnace was quenched in a tank of water. Samples were collected by holding a ladle in the stream of glass 18 and annealing the sample in a muffle.

Several different batch compositions were successfully melted during the trials including the following:

| Batch | Asbestos | Cullet | Sodium Hydroxide |
|---|---|---|---|
| 1 | 45% | 47.5% | 7.5% |
| 2 | 55% | 40.0% | 5.0% |
| 3 | 65 wt % | 32.5% | 2.5% |
| 4 | 75 wt % | 23.8% | 1.2% |
| 5 | 78 wt % | 22.0% | 0% |
| 6 | 100% blue asbestos | 0% | 0% |

The asbestos used in Batches 1 to 5 was a mixture of brown and white asbestos obtained from the power station stripping contractors.

Typical results for Batch 3 at a charge rate of 15 kg/hr were as follows:

|  | Temperature | Power |
|---|---|---|
| Crown | 1200° C. | 13.2 kW |
| Furnace | 1350° C. | 18.3 kW |
| Riser | 1225° C. | 2.9 kW |
| Forehearth | 1250° C. | 4.4 kW |

The trials confirmed the findings of the trial melts of Example I that mixtures of asbestos with varying amounts of cullet and sodium hydroxide could be melted together to form a clear glass. In addition it was found that all the mixtures tried could be melted including 78% asbestos with 22% cullet and no addition of sodium hydroxide.

There was every indication that even higher properties of asbestos could be melted but it was found expedient to include at least some sodium ions in the batch to ensure that the vitrified melt always remained conductive. This was achieved by adding glass cullet containing approximately 14% $Na_2O$ to the batch to achieve a minimum sodium oxide content of about 3%. At the end of the tests a short trial on melting 100% blue asbestos was carried out. The tests indicated that the blue asbestos melted readily without any addition of cullet or sodium hydroxide. The improved range of compositions that could be melted compared with crucible tests was attributed in part to the fact that material floated onto the surface of molten liquid in the electric furnace has a larger relative liquid/solid reaction interface than was the case in a crucible filled with unmelted product and then heated from the outside.

A sample of fibre produced using Batch 2 which was a mix of 55% brown and white asbestos plus glass cullet was analysed for asbestos content using dispersion staining and polarised light microscopy. The fibres were found to have the characteristics of a fibrous silicate which had a random non-crystalline structure. They exhibited no polarisation colours and were isotropic (ie. light vibrating east-west from the polariser continued vibrating east-west in the specimen, and was absorbed by the analyser) like man-made mineral fibres (mmmf) for example glass fibre. No characteristics were found in the samples that were possessed by crystalline inorganic fibres such as asbestos, ie. fibres which could be physically broken down into microfibres or exhibited birefringence. It therefore could be said that the fibres produced possessed the characteristics of manmade mineral fibre, eg. glass fibre that were usually found using this analysis technique and showed none of the mineral characteristics of asbestos.

EXAMPLE III

Samples of a colourless soda-lime glass, ie. a milk bottle, and of a glass made as described in Example II above were prepared and tested for hydrolytic resistance according to ISO 719, a grain test at 98° C. Results were obtained as follows:

| Soda-lime glass |
|---|
| (a) 0.69 ml 0.01 N HCl = 214 $\mu$g $Na_2O$/g. glass |
| (b) 0.69 ml 0.01 N HCl = 214 $\mu$g $Na_2O$/g. glass |
| (c) 0.69 ml 0.01 N HCl = 214 $\mu$g $Na_2O$/g. glass |
| Asbestos-derived glass |
| (a) 0.28 ml 0.01 N HCl = 78 $\mu$g $Na_2O$/g. glass |
| (b) 0.25 ml 0.01 N HCl = 78 $\mu$g $Na_2O$/g. glass |
| (c) 0.26 ml 0.01 N HCl = 81 $\mu$g $Na_2O$/g. glass |

The resultant solutions from the treatment of grains according to ISO 719 were analysed and results obtained as follows:

|  | Soda-lime $\mu$g/g.class | Asbestos-derived $\mu$g/g.glass |
|---|---|---|
| Silica, $SiO_2$ | 386 | 75 |
| Calcium oxide, CaO | 15 | 13 |
| Magnesium oxide, MgO | 1 | 25 |
| Sodium oxide, $Na_2O$ | 177 | 24 |
| Potassium oxide, $K_2O$ | 9 | 10 |

The results of the ISO 719 test show that the asbestos-derived glass was more resistant to water attack than the soda-lime glass milk bottle. Analyses of the reaction solutions showed that the release of silica and soda were lower, magnesia and potash higher and lime about the same from asbestos-derived glass than from a soda-lime glass.

We claim:

1. A process for converting waste asbestos into a glass which comprises:
    heating within an electrical glass melting furnace a body of molten glass so as to maintain said body of molten glass at a temperature above the decomposition temperature of asbestos;
    supplying asbestos to the furnace by conveyor means discharging above the body of molten glass so that the asbestos falls onto the molten glass and becomes decomposed and is melted to glass, the asbestos that has fallen onto the molten glass being subjected for a sufficient period to a temperature above its decomposition temperature that it is completely melted and becomes part of the body of molten glass and the asbestos being supplied in an amount such that a substantial proportion of the molten glass in said body is derived therefrom, wherein said conveyor means discharges the asbestos into a melting chamber containing partition means contacting the body of molten glass and defining a submerged throat in said furnace; and
    withdrawing molten glass from the furnace at a temperature of at least 1000° C.

2. In a process for converting waste asbestos into a glass by feeding asbestos into a closed melting chamber of an electrical glass melting furnace by conveyor means discharging above the body of molten glass so that the asbestos falls onto the molten glass becomes dissolved and is melted to glass with the asbestos being supplied in such amount that a substantial proportion of the molten glass is derived therefrom, flowing said glass to forehearth means by partition means depending from a roof of said furnace into the body of molten glass to define a submerged throat for said furnace and riser means leading from said throat to said forehearth means, and discharging the molten glass through an orifice in the forehearth means, preventing premature crystallisation of materials present in the melt on contact with the surfaces of said throat, riser, forehearth and orifice by maintaining the temperature of the molten glass above 1100° C. until the glass is discharged through the orifice.

3. The process of claim 1, wherein the glass in the melting chamber is heated by means of electrode means in the body of molten glass and by radiant heater means disposed above the body of molten glass.

4. The process of claim 3, wherein the glass passes from said throat by riser means to forehearth means, means in said forehearth means defining a bottom opening through which molten glass is discharged.

5. The process of claim 4, wherein the forehearth is heated by second radiant heater means disposed above the molten glass.

6. A process according to claim 1, wherein the asbestos is mixed with cullet before it is fed into the furnace.

7. A process according to claim 1, wherein the asbestos is mixed with glass-making materials before it is fed into the furnace.

8. A process according to claim 6, wherein the asbestos is fed into the furnace by sealed mixing and conveying means.

9. A process according to claim 8, wherein an asbestos waste hopper and a cullet or glass-making materials hopper feed into a screw conveyor leading to the furnace.

10. A process according to claim 6, wherein the material supplied to the furnace further comprises a melt accelerator.

11. A process according to claim 10, wherein the melt accelerator is selected from the group consisting of alkali metal compounds, alkaline earth metal compounds, boron compounds, or chlorides or blast furnace slag.

12. A process according to claim 11, wherein the melt accelerator comprises sodium hydroxide.

13. A process according to claim 12, wherein the material fed to the glass melting furnace comprises 20-80%, by weight asbestos, 80-20% cullet and 0.5-5% sodium hydroxide.

14. A process according to claim 1, wherein the furnace is maintained at a temperature of more than 1250° C. and the residence time of the asbestos is at least 1 hour.

15. A process according to claim 1, wherein a stream of glass discharged from the furnace is quenched by passage into a bath of water.

* * * * *